US006453154B1

(12) United States Patent
Haber et al.

(10) Patent No.: US 6,453,154 B1
(45) Date of Patent: Sep. 17, 2002

(54) MOVEABLE ANTENNA EMPLOYING A HYBRID RF AND DC CIRCUIT

(75) Inventors: William Joe Haber, Tempe; Kevin Duane House, Gilbert; David Wilson Edwards, Scottsdale, all of AZ (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/415,894

(22) Filed: Oct. 8, 1999

(51) Int. Cl.[7] .................................................. H04B 1/38
(52) U.S. Cl. .......................... 455/90; 455/129; 455/575
(58) Field of Search ............................ 455/90, 95, 575, 455/414, 129, 550

(56) References Cited

U.S. PATENT DOCUMENTS

| | | | | | |
|---|---|---|---|---|---|
| 3,013,225 | A | | 12/1961 | Ouchi | 333/24 |
| 5,535,435 | A | * | 7/1996 | Balzano et al. | 455/89 |
| 5,590,416 | A | * | 12/1996 | Rydbeck | 455/90 |
| 5,630,211 | A | * | 5/1997 | Nagai | 455/89 |
| 5,640,689 | A | * | 6/1997 | Rossi | 455/89 |
| 5,734,716 | A | * | 3/1998 | Kulberg | 455/90 |
| 5,850,612 | A | * | 12/1998 | Kulberg et al. | 455/550 |
| 5,898,933 | A | * | 4/1999 | Kaschke | 455/575 |
| 5,909,653 | A | | 6/1999 | Imura et al. | 455/575 |
| 6,002,943 | A | * | 12/1999 | Irvin et al. | 455/522 |

FOREIGN PATENT DOCUMENTS

| | | | |
|---|---|---|---|
| EP | 0694985 | 1/1996 | H01Q/1/24 |
| EP | 0771046 | 5/1997 | H01Q/1/24 |
| GB | 2317993 | 4/1998 | H01Q/1/10 |
| WO | 9914817 | 3/1999 | H01Q/1/08 |

* cited by examiner

*Primary Examiner*—Daniel Hunter
*Assistant Examiner*—Thuan T. Nguyen
(74) *Attorney, Agent, or Firm*—Ingrassia Fisher & Lorenz

(57) ABSTRACT

A moveable antenna system with a position sensor circuit and a circuit which transmits the position sensing data and the radio frequency (RF) on the same wire. The position sensor comprises a sensing pin and a sense track concentric with the coaxial cable for the RF signal. When the antenna is in the preferred position for transmission, the sensing pin is in contact with the sense track, thus closing a switch, allowing the unit to transmit RF signals. Otherwise, the sensing pin is not in contact with the sense track, preventing any transmission of data. The signal that results from the opening and closing of the switch is carried on the same transmission line as the RF signal. This is accomplished by using capacitors to block direct current (DC) from the transmission line and using resistors and shunt capacitors to prevent any leakage of RF signals onto the sensing circuit.

19 Claims, 3 Drawing Sheets

MOVEABLE ANTENNA EMPLOYING A HYBRID RF AND DC CIRCUIT

FIELD OF THE INVENTION

The present invention relates, generally, to a moveable antenna for use with a cellular telephone, radio, or other communication device, and more particularly to an antenna employing a hybrid radio frequency (RF) and direct current (DC) circuit for transmitting RF signals to and from its associated communication device.

BACKGROUND

Portable communication devices, such as cellular telephones, two-way and multi-party radio communication devices, and the like often employ a retractable and sometimes even a removable antenna assembly. To achieve optimum performance, it is advisable to orient the antenna vertically, particularly when receiving radio frequency (RF) transmission which is vertically oriented. However, communication devices (e.g., cellular telephones) having antennas which are not rotatable often suffer impaired transmission performance if the antennas are not oriented vertically during normal use of the cellular phone.

Other known cellular telephones employ antennas which are removable. Typically, these phones continue to transmit an RF signal even when the antenna is removed. This can result in unnecessary power depletion and unnecessary wear on the electrical components which make up the transmission circuit.

Existing cellular telephones which employ a moveable antenna utilize a dedicated RF circuit for transmitting and receiving RF signals, as well as a dedicated DC circuit for carrying a signal to the telephone host processor which indicates antenna orientation and whether the antenna is connected or removed. The use of such a dedicated RF circuit and a dedicated DC circuit results in increased manufacturing costs and reduces reliability and performance.

A positionable antenna assembly for use with portable communication devices is thus needed which overcomes the shortcomings of the prior art.

BRIEF DESCRIPTION OF THE DRAWINGS

The present invention will hereinafter be described in conjunction with the appended drawing figures, wherein like numerals denote like elements, and.

DETAILED DESCRIPTION

Figure 1:
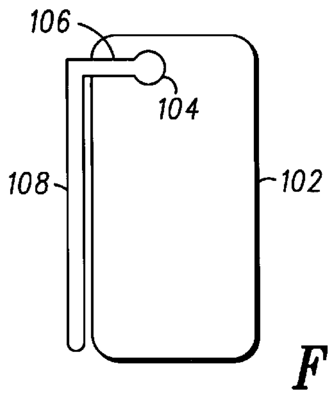
FIG. 1 is a schematic representation of a communication device showing its antenna in the stowed position.
Figure 3:
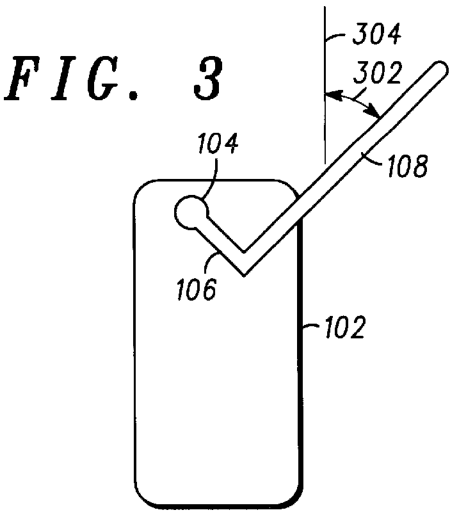
FIG. 3 shows the communication device of FIGS. 1 and 2 with its antenna in the fully extended position.
Figure 2:
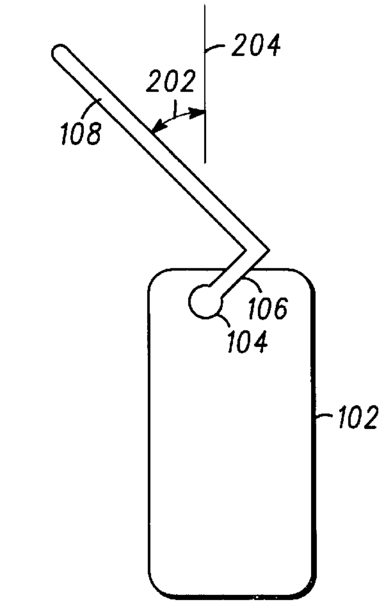
FIG. 2 shows the communication device of FIG. 1 with its antenna in a partially extended position.

Referring now to FIGS. 1–3, a communication device 102 is equipped with an antenna 108 mounted to communication device 102 via a connector arm 106 and a pivot 104. Communication device 102 may comprise a cellular telephone, a portable telephone, a wireless device such as a radio communication device, or virtually any other electronic communications device which employs radio frequency (RF) transmission. Communication device 102 includes an RF circuit (discussed below in conjunction with FIGS. 11 and 12) configured to communicate with a remote transceiver. These transceivers are typically located on towers on buildings, mountains, or the like, or on orbiting satellites. In any case, it is often desirable to operate communication device 102 with antenna 108 extended in the vertical position. However, it is often uncomfortable or inconvenient for a user to position communication device 102 such that its antenna is maintained vertically and engage in conversation at the same time. This problem is exacerbated when the user is laying down, driving or otherwise constrained. Consequently, quality of RF reception is compromised.

In accordance with one aspect of the present invention, antenna 108 can be manually manipulated to assume two or more positions to thereby place antenna 108 in a vertical orientation while still allowing convenient and comfortable use of the communication device. For example, FIG. 2 shows antenna 108 in a partially extended or "left handed" position, while FIG. 3 shows antenna 108 in a fully extended or a "right handed" position. More particularly, assume FIGS. 1–3 illustrate communication device 102 from the rear position, such that only the back of communication device 102 can be seen. The audio speaker and microphone (not shown) located on the front side of the communication device may be conveniently positioned proximate to a user's ear and mouth, respectively, while holding communication device 102 in a user's left hand; with antenna 108 in the partially extended position shown in FIG. 2, antenna 108 would assume a vertical orientation. On the other hand, when antenna 108 is in the fully extended position shown in FIG. 3, a user can conveniently hold communication device 102 using the right hand while maintaining antenna 108 in a substantially vertical disposition.

In accordance with a preferred embodiment of the present invention, when antenna 108 is in the partially extended position shown in FIG. 2, antenna 108 is at an angle 202 with respect to an arbitrary vertical line 204; when antenna 108 is placed in the fully extended position shown in FIG. 3, it assumes and angle 302 which respect to an arbitrary vertical line 304. In a preferred embodiment, angles 202 and 302 are in the range of 10 to 80 degrees, and preferably in the range of 30 to 60 degrees, and optimally about 45 degrees. In accordance with an alternate embodiment of the invention, antenna 108 may be adjusted into any number of intermediate positions between the partially extended and the fully extended position. In this way, communication device 102 may be comfortably used by the user in virtually any position, while at the same time conveniently adjusting antenna 108 into a vertical orientation.

Figure 4:
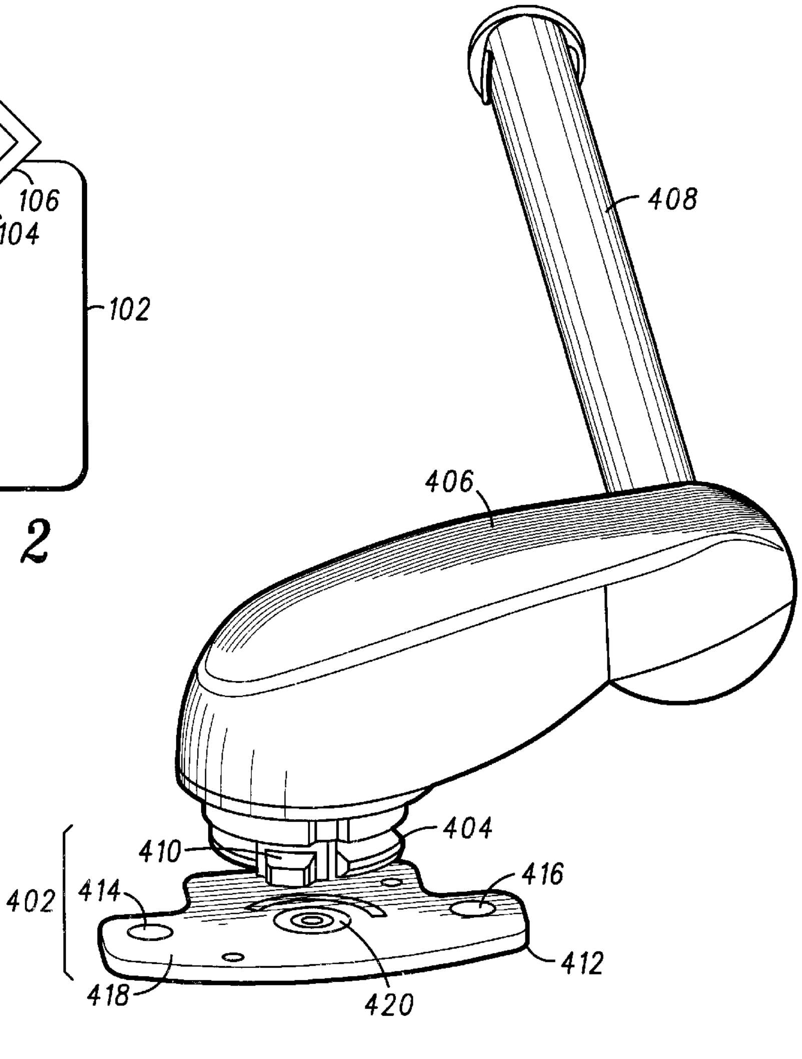
FIG. 4 is a partially exploded view of an antenna connector assembly aligned with a printed wiring board of a mating communication device.
Figure 5:
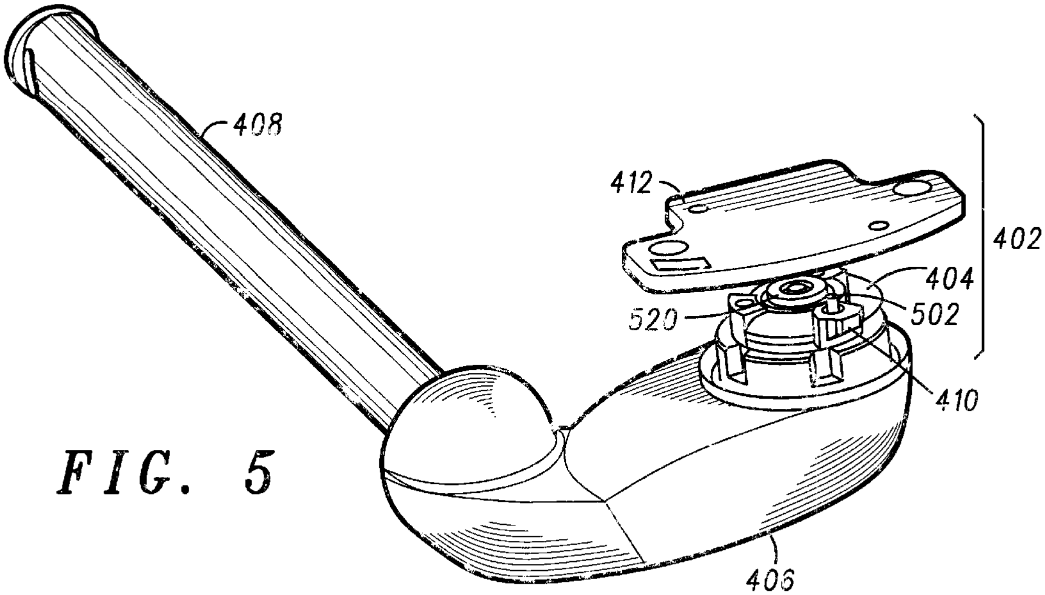
FIG. 5 is an alternate view of the assembly of FIG. 4.

Referring now to FIGS. 4 and 5, a connector assembly 402 is configured to connect an antenna 408 and its associated connector arm 406 to a communication device (hereinafter referred to as a cellular telephone or simply cellular phone for simplicity). Connector assembly 402 suitably includes one or more tabs 410 disposed along a race 404; tab 410 and race 404 are desirably configured to be removably mounted to a mating connector member (not shown) on the cellular phone associated with antenna 408. The particular mechanical attachment details of connector assembly 402 are beyond the scope of the present invention, and are discussed more fully in co-pending U.S. patent application Ser. No. 09/414,467 and entitled "Antenna Latching Mechanism", filed in the names of Kevin House, Javier Leijo, Ronald Nordheus, Matthew Michieli, and Jay Mitchell (also assigned to Mototola, Inc. and corresponding to Motorola Docket No. CS10252). The entire contents of the foregoing co-pending patent application are hereby incorporated by this reference.

With continued reference to FIGS. 4 and 5, connector assembly 402 further comprises a printed wiring board (PWB) 412 having a board track 420 disposed on an upper surface 418 thereof. Board 412 may be conveniently secured to its cellular phone by using, for example, fastening holes 414 and 416. With particular reference to FIG. 5, connector assembly 402 also includes an antenna connection circuit 520 and a tracer pin 502 disposed opposite board track 420, as discussed in greater detail below in connection with FIGS. 6 and 7.

Figure 6:
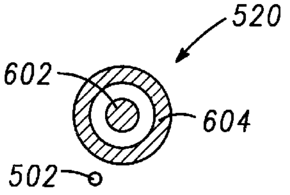
FIG. 6 is a schematic representation of an antenna connector circuit.
Figure 7:
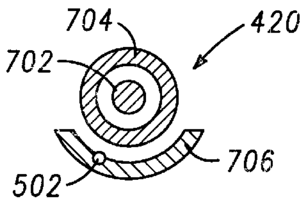
FIG. 7 is a schematic representation of a board track circuit.

Referring now to FIGS. 6 and 7, antenna connection circuit 520 and board track 420 cooperate to form an RF interface which allows RF transmission back and forth between the antenna and the cellular phone. In a preferred embodiment of the present invention, this RF coupling circuit is concentric with the pivoting (or rotating) motion of connector assembly 402 (FIGS. 4 and 5). In this way, the rotating or pivoting mechanical motion of the antenna may be effectively leveraged to provide a position sensing function within connector assembly 402, as described in greater detail below in connection with FIGS. 6–12.

More particularly, antenna connector circuit 520 shown in FIGS. 5 and 6 includes an RF conductor 602, a shield 604, and tracer pin 502, also referred to as a sensing or sense pin. RF conductor 602 is configured to carry RF signals to and from antenna 408 (FIGS. 4–5).

With particular reference to FIG. 7, board track circuit 420 includes an RF conductor 702, a shield 704, and a sense track 706. RF conductor 702 is suitably configured to carry RF signals to and from the cellular phone to which antenna 408 is connected, as described below in connection with FIGS. 11 and 12.

When PWB 412 is mated with antenna connector circuit 520 (FIGS. 4 and 5), RF conductor 602 contacts RF conductor 702, placing them into electrical communication with one another. In similar fashion, shield 604 contacts shield 704, forming an RF shield about respective RF conductors 602 and 702, forming a mating coaxial or "COAX" conductor. When PWB 412 is placed into contact with antenna connector circuit 520, for example when antenna 408 (FIGS. 4–5) is connected to its associated cellular phone, sense pin 502 of antenna connector circuit 520 is brought into proximity with sense track 706 (see FIG. 7). When pin 502 is in contact with track 706, the position sensing circuit between the antenna and the cellular phone is completed, which permits the RF transmission circuit associated with the cellular phone to transmit RF signals to the antenna. The specific methods and structures for completing the RF connection between the antenna and the cellular phone are discussed in detail below in connection with FIGS. 11 and 12.

Referring again to FIGS. 6 and 7, it will be appreciated that while pin 502 is in contact with track 706, the RF transmission circuit associated with the cellular phone is capable of transmitting RF signals to the antenna and receiving RF signals from the antenna. Conversely, when the pin is not in contact with its associated track, the RF transmission circuit associated with the cellular phone is set such that the cellular phone can no longer transmit. Moreover, in accordance with a preferred embodiment of the present invention, when the RF sensing pin is not in electrical contact with its associated sense track, either because the antenna has been rotated "out of position" or because the antenna assembly has been detached from the cellular phone, the RF transmission circuit associated with the cellular phone is disabled from transmitting RF signals at all. This is particularly advantageous in that it avoids the undesirable condition where the RF transmitting circuit associated with the cellular phone continues to transmit into what is essentially an open circuit, i.e., when the antenna is either removed or not properly configured for electrical communication with the RF transmission circuit.

In accordance with a further aspect of the present invention, the arc traversed by track 706 may be configured to correspond with the arc traversed by antenna 108 (see FIGS. 1–3) between the partially extended position (FIG. 2) and the fully extended position (FIG. 3). Indeed, by properly coordinating sense track 706 of FIG. 7 (or the alternate embodiment sense tracks discussed in connection with FIGS. 8–10) with the desired arc of travel for antenna 108, communication device 102 can be configured to terminate RF transmission both when the antenna is removed form the device as well as when the antenna is not in proper position, i.e., when the sense pin is not properly in contact with its associated sense track.

Figure 8:
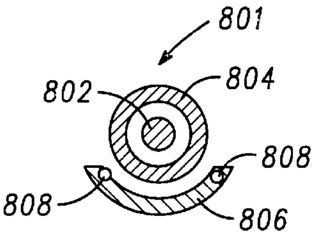
FIGS. 8 through 10 are schematic representations of alternate embodiments of the board track circuit of FIG. 7.
Figure 9:
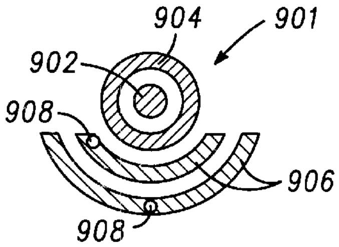
Figure 10:
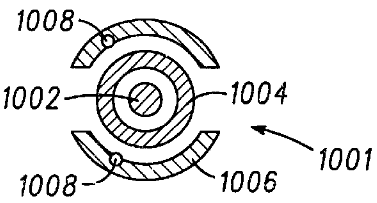

Referring now to FIGS. 8–10, the range of travel of antenna 108 (FIGS. 1–3) during which the RF transmission circuit associated with communication device 102 is permitted to operate may be effectively controlled by the length (i.e., extent) and orientation of the sense track or sense tracks associated with PWB 412 (FIGS. 4–5). In this regard, a variety of options are available to extend the functionality of the present invention by employing one or more additional sense pins and/or one or more additional sense tracks.

More particularly and with specific reference to FIG. 8, a board track circuit 801 in accordance with an alternate embodiment of the present invention suitably comprises an RF conductor 802, a shield 804, and a sense track 806 (all of which are generally analogous to the corresponding components shown in FIG. 7). In accordance with the embodiment shown in FIG. 8, the antenna connector circuit (analogous to circuit 520 of FIG. 5) associated with the antenna coupling includes cooperating sensing pins 808. In this embodiment, pins 808 are configured such that when the antenna is in its vertical or substantially vertical position, both pins contact the track. The sensing circuitry (described below in connection with FIGS. 11 and 12) associated with pins 808 may be configured to determine whether one or both of the pins are in contact with track 806. For example, each of dual pins 808 may be suitably tied to electrical ground through a resistor, such that a first level of resistance is detected when one pin is in contact with a track, and a second level of resistance is detected when both pins are in contact with a track. In this way, the communication device can determine not only whether the antenna is in the vertical position, but the extent to which the antenna has deviated from the vertical position. In response to this information, the communication device could be configured to increase power or make other adjustments, as necessary, to accommodate the particular position of the cellular phone. In accordance with a further aspect of the present invention, when the antenna has deviated from a vertical position by a threshold amount, the communication device could be configured to alert the user, either through audible, optical, textual, or mechanical (e.g., vibrating) modalities to manipulate the communication device or the antenna to restore the antenna to a vertical or substantially vertical position.

With continued reference to FIG. 8, additional flexibility may be obtained by employing three or more pins (and, if desired, three or more corresponding resistors associated with the pins) to gather antenna position data of even finer granularity. For example, using three pins and three known resistance values (e.g., equal resistance values), the detection circuit could be configured to measure R/3 near the center of travel (corresponding to optimum vertical antenna position), R/2 for an area of travel near the center, and R at the edge of the allowed range of antenna position. In accordance with a further aspect of this embodiment, the antenna detection circuit could be configured to detect essentially an open circuit in an undesired range of antenna positions, for example corresponding to the antenna being moved impermissibly far from the vertical position or corresponding to the antenna being physically decoupled from its associated communications device.

Referring now to FIG. 9, multiple sense tracks may be employed. More particularly, a board track circuit 901 employing plural tracks suitably comprises an RF conductor 902, a shield 904, and a dual track assembly 906. In accordance with the embodiment shown in FIG. 9, antenna connector circuit 520 (FIG. 5) advantageously comprises dual sense pins 908. In this embodiment, the position detector circuit (shown in FIGS. 11 and 12) may be configured to sense a first resistance value when one of pins 908 is in contact with dual track 906, and a second resistance value when both pins 908 are in contact with dual track 906 (a third resistance value, for example an open circuit or a closed circuit, could also represent the condition when neither of dual pins 908 are in contact with dual track 906).

Referring now to FIG. 10, a further alternate embodiment of the present invention comprises a board track circuit 1001 including an RF conductor 1002, a shield 1004, and concentric opposing arcs 1006. In this embodiment, antenna connector circuit 520 (FIG. 5) advantageously includes dual pins 1008. Depending on the length of one or both of arcs 1006 and the relative positions of pins 1008, the position sensing circuit may be conveniently configured to detect when neither, one or both pins 1008 are in contact with dual track 1006, thereby providing precise antenna position information to the RF transmission circuit.

Figure 11:
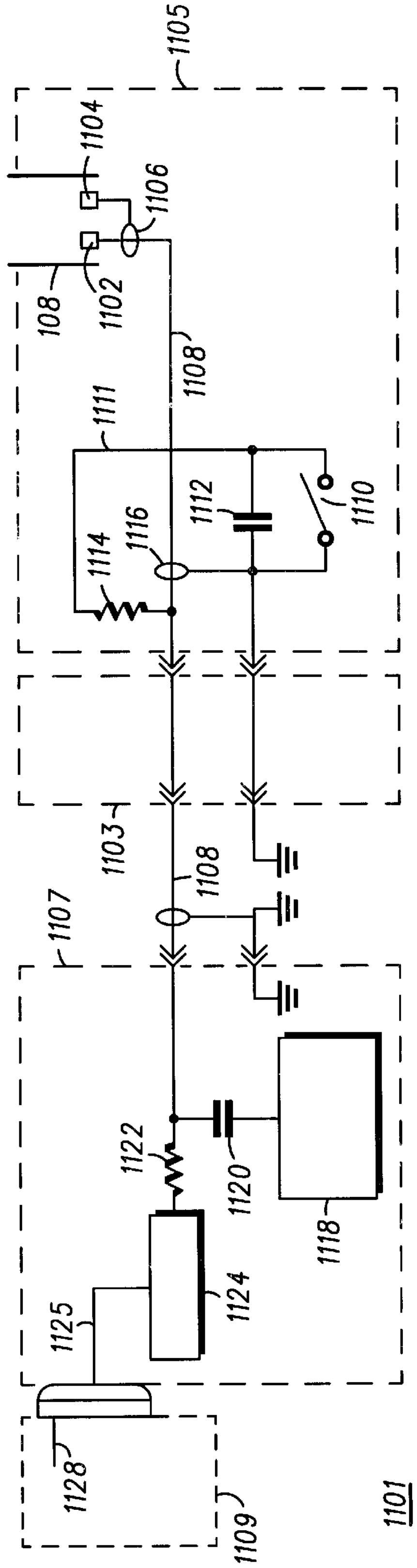
FIG. 11 is a schematic block diagram of a hybrid RF and DC circuit for connecting an antenna with a communication device.

Referring now to FIG. 11, a hybrid RF/DC coupling circuit 1101 suitably comprises an antenna circuit 1105 associated with antenna 108, an antenna/communication device interface circuit 1103, an RF circuit 1107, and a host processor circuit 1109. In general, antenna circuit 1105 is integral with antenna 108; in a preferred embodiment, antenna circuit 1105 is connected to antenna 108 either directly or through connector arm 106 (FIG. 1). In a particularly preferred embodiment, antenna circuit 1105 generally corresponds to antenna connector circuit 520 and sense pin 502 (FIGS. 5–6) in its overall function. It will also be appreciated that many of the pin configurations of the alternate embodiments discussed in FIGS. 8–10 may also be embodied in antenna circuit 1105 as desired.

With continued reference to FIG. 11, interface circuit 1103 is generally analogous to board 412 of FIGS. 4 and 5 in its overall function. That is, interface 1103 advantageously provides electrical communication between antenna circuit 1105 and RF circuit 1107 and activates sense pin when the antenna is within its desired range of positions. As discussed above, in accordance with one aspect of the present invention, interface circuit 1103 is configured to prevent RF transmission between the antenna and its associated cellular phone when the antenna assembly is either removed from the cellular phone or when the antenna is not within its desired range of positions. In this regard, it would be understood that interface circuit 1103 may embody board track 420 (FIG. 4) or one of the other various alternate board track embodiments discussed above in connection with FIGS. 8–10, as desired.

RF circuit 1107 comprises a transceiver circuit 1118 (comprising both a transmission circuit and a receiving circuit), an isolation capacitor 1120, a resistor 1122, a comparator 1124, and an output 1125. As described below in greater detail, comparator 1124 is configured to compare an input DC signal to a desired reference DC value and output a binary signal representative of the state of antenna 108. More particularly, comparator 1124 is configured to output a logic high value when antenna 108 is attached to the cellular phone and within its permitted range of motion, and to output a logic low value when the antenna is either removed from the cellular phone or outside its operating range. In the embodiment shown in FIG. 11, output 1125 is configured to transmit a binary signal to an input 1128 associated with host processor circuit 1109. Upon determining the state of antenna 108, host processor circuit 1109 suitably transmits an appropriate control signal to RF transceiver circuit 1118 through any convenient conductive path (not shown). In response, RF transceiver circuit 1118 is enabled to transmit and receive RF signals when the output of comparator 1124 indicates that antenna 108 is connected to the cellular phone and properly positioned; conversely, transceiver circuit 1118 is configured to terminate RF transmission when the output of comparator 1124 indicates that antenna 108 is either decoupled from the cellular phone or otherwise out of its desired range of operating positions. In an alternate embodiment, comparator 1124 may be configured to apply a control signal, for example a binary logic signal, directly to transceiver circuit 1118.

With continued reference to FIG. 11, a coaxial (or coax) conductor 1108 is suitably configured to carry RF signals between antenna 108 and RF circuit 1107. More particularly, antenna circuit 1105 comprises an RF contact 1102, a ground contact 1104, and a shield 1106 as is conventional in the art.

Antenna circuit 1105 further comprises a sensing circuit 1111 which includes a switch 1110, a capacitor 1112, a resistor 1114, and a grounded shield 1116 (which may suitably be co-extensive with shield 1106). It will be appreciated that switch 1110 generally corresponds in its overall function to pin 502 shown in FIG. 5, as well as the analogous pins discussed in connection with FIGS. 8–10. Moreover, coax conductor 1108 and shield 1116 are generally analogous in function to RF conductor 602 and shield 604, respectively, as discussed above in connection with FIG. 6 (as well as the analogous RF conductors and shields discussed in connection with FIGS. 8–10). Consequently, the condition in which switch 1110 is in the closed position corresponds to pin 502 being an electrical communication with track 706 as discussed above in connection with FIG. 7 (and as also discussed in connection with the alternative embodiments described above in conjunction with FIGS. 8–10). Conversely, the open position of switch 1110 corresponds to the situation in which the sensing pin is not in contact with its associated track.

In accordance with an alternate embodiment of FIG. 11, sensing circuit 1111 could be configured to include a plurality of switches and one or more additional resistors to accommodate the multiple pin and multiple track embodiments discussed above in connection with FIGS. 8–10.

Figure 12:
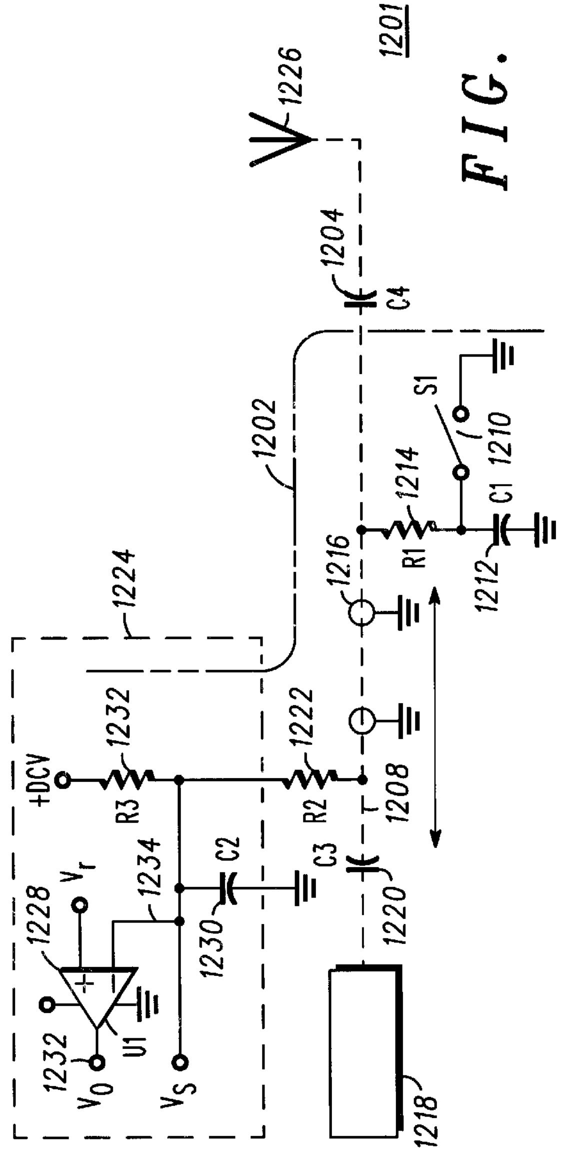
FIG. 12 is a detailed electrical schematic diagram of a hybrid RF and DC circuit for use in connecting an antenna to a communication device.

Referring now to FIGS. 11 and 12, the operation of hybrid RF/DC coupling circuit 1101 will now be described in greater detail.

Referring now to FIG. 12, an electrical schematic diagram illustrates a preferred implementation of a switching circuit and a comparator circuit for use in connection with the hybrid circuit of FIG. 11. More particularly, a hybrid circuit 1201 suitably comprises a coaxial conductor 1208 configured to transmit RF signals between an antenna 1226 and an RF transceiver circuit 1218. Hybrid circuit 1201 further comprises a switch 1210, a capacitor 1212, a resistor 1216, respective isolation capacitors C3 and C4, one or more (preferably coextensive) grounded shields 1216, a resistor 1222, and a comparator circuit 1224. Comparator circuit 1224 is suitably configured to generate an output signal 1232, for example a binary signal indicative of the state or position of antenna 1226 (analogous to that described above in connection with output 1125 in FIG. 11), and to apply output signal 1232 to transceiver 1218. In this way, if antenna 1226 is either disconnected from the cellular phone or not in its proper position, hybrid circuit 1201 can detect this condition and instruct transceiver circuit 1218 to terminate RF transmission, as desired. In accordance with a further aspect of the present invention, hybrid circuit 1201 is capable of carrying a DC signal indicative of the state of position of antenna 1226 as well as the RF signal transmitted from and received by antenna 1226 on a single coax conductor, namely, coax conductor 1208.

With continued reference to FIG. 12, the high frequency RF signals (typically in the range of 900 megahertz (MHz) to 2 gigahertz (GHz)) readily pass through isolation capacitors 1220 and 1204, in view of the fact that capacitors 1220 and 1204 present a relatively low or even imperceptible impedance to the high frequency RF signals. Thus, capacitors 1220 and 1204 essentially function as high pass filters, allowing the RF signals to pass therethrough, yet at the same time block the relatively low switching frequency associated with switch 1210. In this regard, the switching frequency will necessarily be quite low, inasmuch as it is required to bring the antenna into and out of its permissible range of positions in order to open and close switch 1210. Capacitors 1204 and 1220 are suitably in the range of 10 picofarads (pF) to 100 pF.

Moreover, the relatively high impedance associated with resistors 1214 and 1222 prevent the RF signals from entering into either comparator circuit 1224 or from crossing resistor 1214, as discussed in greater detail below.

Capacitors 1220 and 1204 also essentially filter the low frequency switching noise and prevent the low frequency signal from entering transceiver circuit 1218 or antenna 1226.

Comparator circuit 1224 suitably comprises an amplifier 1228, a capacitor 1230, and a resistor 1232. Amplifier 1228 suitably comprises a comparator, for example a part number 1M 106 available from the National Semiconductor corporation. However, the term comparator is used in a functional manner. Amplifier 1228 may comprise solely a single transistor. In the preferred embodiment, two transistors are used; one transistor to compare the signals and one transistor to invert the output. In accordance with the illustrated embodiment, a predetermined reference voltage (for example ¾ of supply voltage which is 3 volts in preferred embodiment) is applied to the positive terminal of amplifier 1228, with the negative terminal being connected to conductor 1234. A supply DC voltage (DCV) is suitably applied across resistor 1232. Hence, when switch 1210 is open, voltage DCV is presented at the negative input terminal to amplifier 1228. In the preferred embodiment, the reference voltage ($V_r$) applied to the positive terminal of amplifier 1228 is suitably smaller than the DCV voltage applied to the negative terminal of amplifier 1228 when switch one is open. In this state, the operational amplifier is configured to generate an output 1232 which is a logical low value, indicating to transceiver circuit 1218 that antenna 1226 is either not connected to the cellular phone or is not within its permissible range of positions. In response, transceiver circuit 1218 is disabled from transmitting RF signals. In accordance with one aspect of the present invention, it is advantageous to disable the transmitter associated with the communications device when the antenna is either missing or not in its proper position, to both conserve power and reduce wear and possibly even damage on RF transceiver circuit 1118 (see FIG. 11).

It will also be understood that when switch 1210 is open, no current flows through resistors 1222 and 1214 (defined as a DC path 1202) inasmuch as open switch 1210 essentially presents a DC open circuit between resistors 1222 and 1214 and ground. When switch 1210 is closed, a current path to ground is provided to supply voltage DCV through resistor 1232, resistor 1222, resistor 1214, and switch 1210. When switch 1210 is in the closed position, the voltage applied to the negative input of amplifier 1228 is reduced to the following value:

$$V_s=DCV(R1+R2)/(R1+R2+R3)$$

Where R1, R2 and R3 correspond to the resistances associated with resistors 1214, 1222, and 1232, respectively. The values of supply voltage DCV and of resistors 1214, 1222, and 1232 are also selected so that the foregoing voltage division results in a voltage level at the negative input of amplifier 1228 which is now less than the reference voltage applied to the positive input of amplifier 1228. Consequently, output 1232 of amplifier 1228 changes state, i.e., output 1232 goes to a logical high value, indicating that switch 1210 is closed and further indicating that antenna 1226 is within its desired range of operating positions.

When antenna 1226 is subsequently removed from its cellular phone or is moved out of its permissible operating position, switch 1210 opens, and the voltage level at the negative input of amplifier 1228 jumps above the reference voltage applied to the positive terminal of amplifier 1228, causing output 1232 to again go to a logic low level.

In accordance with a further aspect of the present invention, the ability of coax 1208 to simultaneously transmit the DC switching signal and the RF signal is further enhanced by the presence of capacitors 1212 and 1230. More particularly, capacitors 1212 and 1230 present a low reactance to the RF signal, thereby keeping the RF signal out of the DC circuits. In particular, the reactance of a capacitor is given by:

$$X(\text{reactance})=\tfrac{1}{2\pi fC}$$

Where f corresponds to the frequency seen by the capacitor, and C is the capacitor's capacitance. By presenting a low reactance to the RF signals, capacitors 1212 and 1230 effectively shunt any spurious RF signals to ground, keeping them out of the DC circuitry.

Thus, it is apparent that there has been provided, in accordance with the invention, methods and structures for sensing the position of an antenna and transmitting a DC signal indicative of that position to the host communication device along the same RF coax conductor which the antenna and communications device use to communicate RF signals. Although the invention has been described with reference to the illustrated and alternate embodiments, it is not intended that the invention be so limited. For example, while the sensing pin (or pins) has been described as being located on the antenna circuit and the sensing track has been described as being located on the communications device side of the antenna/communications device interface, the invention would work equally well if the locations of the track and sensing pin were inverted. In addition, the sensing pin has been described as being in contact with the sensing track when the antenna is in the correct position and not in contact with the sensing track when the antenna is not in the correct position. These two states could be reversed with no change in functionality. Moreover, although the sense pin (or pins) have been described as being connected to the coax line through a resistor, the various sensing devices could also be capacitively or inductively coupled to the sensing circuit, as desired. In addition, although the invention has been described in connection with arced sensing circuits located concentrically with respect to the antenna pivot point, the invention could also be implemented in the context of a sliding (e.g., linear) antenna, or in virtually any sensing paradigm such as elliptical or serpentine, and need not be concentric or even in an arced configuration so long as antenna position information can be effectively conveyed to the host communications device in accordance with the principles set forth above in the context of the coupling circuit and the hybrid circuits of FIGS. 11 and 12, respectively. In addition, although the output of comparator circuit 1224 is described as being in a logical high state when the antenna is properly positioned and being in a logical low state when the antenna is not properly positioned, these logical values are arbitrary designations and could be inverted, as desired. While comparator circuit 1124 and RF transceiver circuit 1118 are shown in FIG. 11 as occupying the same board, there is no change in functionality if they are on different boards, so long as they are still electrically connected in the same manner. These and other changes, modifications, and substitutions can be made to the various components and method steps described herein without departing from the spirit and scope of the present invention as set forth in the appended claims.

What is claimed is:

1. A connector assembly for removably attaching an antenna to a communication device, comprising;

a connector arm pivotably mounted to said communication device, said connector arm having said antenna extending therefrom and being configured for manual rotation about a pivot axis;

an antenna connector circuit mounted to said connector arm, said antenna connector circuit comprises a first RF conductor, a first shield circumscribing said first RF conductor, and a sense pin;

a board track mounted to said communication device opposite said antenna connector circuit for electronic communication therewith, said board track comprises:

a second RF conductor configured for electrical contact with said first RF conductor;

a second shield circumscribing said second BF conductor and configured for mechanical contact with said first shield; and a sense track configured for electrical contact with said sense pin when an angular position of said antenna is within a permissible range of positions;

wherein said antenna connector circuit and said board track cooperate to produce an output signal indicative of said angular position of said antenna about said pivot axis.

2. The connector assembly of claim 1, wherein said communication device comprises a host processor, and said connector assembly further comprises an output conductor configured to communicate said output signal to said host processor.

3. The connector assembly of claim 1, wherein:

said communication device further comprises an RF transmitter circuit configured to apply RF signals to said antenna; and said connector assembly further comprises an output conductor configured to communicate said output signal to said RF transmitter circuit to enable said transmitter circuit when said angular position of said antenna is within said permissible range of positions, and to disable said transmitter circuit when said angular position of said antenna is not within said permissible range of positions.

4. The connector assembly of claim 1, wherein:

said sense tack comprises a conductive arc;

and said board track and said antenna connector circuit are disposed with respect to each other such that said sense pin remains in electrical contact with said sense track when said angular position of said antenna is within said permissible range, and said sense pin is moved out of electrical contact with said sense track when said antenna is moved out of said permissible range.

5. The connector assembly of claim 1, wherein:

said first and second RF conductors are disposed along said pivot axis;

said first and second shields are concentric about said pivot axis; and said sense track comprises a conductive arc concentric with said pivot axis.

6. A connector assembly for removably attaching an antenna to a communication device, comprising:

a connector arm pivotabiy mounted to said communication device, said connector arm having said antenna extending therefrom and being configured for manual rotation about a pivot axis;

an antenna connector circuit mounted to said connector arm, said antenna circuit comprises a first shield circumscribing a first RF conductor disposed along said pivot axis, and a pair of sense pins; and a board track mounted to said communication device opposite said antenna connector circuit for electronic communication therewith, said board track comprises a second shield circumscribing a second RF conductor disposed along said pivot axis, and a conductive, arc shaped sense track;

wherein said antenna connector circuit and said board track cooperate to produce an output signal indicative of an angular position of said antenna about said pivot axis, wherein said connector assembly is configured such that said first and second RF conductors are in electrical contact, said first and second shields are in mechanical contact, and said pair of sense pins interact with said sense track when said angular position of said antenna is within a permissible range of positions.

7. The connector assembly of claim 6, wherein said pair of sense pins are configured with respect to said sense track such that only one of said sense pins remains in contact with said sense track when said antenna is within said permissible range, and wherein both of said sense pins contact said sense track when said antenna is at an optimum position within said permissible range.

8. The connector assembly of claim 6, wherein said sense track comprises two arc segments concentrically disposed about said pivot axis.

9. A coupling circuit for transmitting radio frequency (PF) signals between an antenna and an associated communication device to which said antenna is removably mounted for manual movement within a predetermined range of positions, the communication device having a transmitter circuit for transmitting RF signals, said coupling circuit comprising:

a coaxial conductor for carrying said RF signals and having a first end configured for electrical communication with said communication device and a second end configured for electrical communication with said antenna;

a switch configured to remain closed when said antenna is within said predetermined range and to remain open when said antenna is not within said predetermined range;

a comparator circuit configured for electrical cooperation with said switch, said comparator circuit being further configured to generate a first output signal when said switch is closed and a second output signal when said switch is open, and to communicate said first output signal to said transmitter circuit to disable said transmitter circuit when said switch is open.

10. The coupling circuit of claim 9, wherein:

said comparator circuit comprises a first input to which a reference voltage signal is applied and a second input to which a direct current voltage (DCV) signal is applied;

said comparator is configured to output a logic high signal when said reference voltage signal is greater than said DCV signal, and to output a logic low signal when said reference voltage signal is less than said DCV signal.

11. The coupling circuit of claim 9, further comprising a first capacitor disposed along said coaxial conductor proximate said communication device, and a second capacitor disposed along said coaxial conductor proximate said antenna, said first and second capacitors being configured to pass signals in the RF range and to not pass signals in the range of one hertz.

12. The coupling circuit of claim 10 further comprising a voltage divider comprising:

a first resistive element having a first characteristic impedance disposed between said coaxial conductor and said switch; and a second resistive element having a second characteristic impedance disposed between said coaxial conductor and said comparator wherein current flows through said voltage divider when said switch is closed, and current is substantially prevented from flowing through said voltage divider when said switch is open.

13. The coupling circuit of claim 12 wherein said first and second characteristic impedance are sufficiently high relative to said antenna and said transceiver circuit to substantially prevent said RF signals from passing through said first and second resistive elements.

14. The coupling circuit of claim 9, further comprising a first reactance element coupled to said comparator and a second reactance element coupled to said switch, said first and second reactance elements being configured to shunt said RF signals away from said comparator and said switch, respectively.

15. The coupling circuit of claim 14, wherein each of said first and second reactance elements comprise a capacitor.

16. The coupling circuit of claim 12, wherein each of said first and second resistive elements comprise a resistor.

17. The coupling circuit of claim 9, wherein said predetermined range of positions includes said antenna being connected to said communication device, such that said antenna is outside said predetermined range when said antenna is disconnected from said communication device.

18. A communication device, comprising:

a transceiver circuit configured to transmit and receive radio frequency (RF) signals;

a connector arm having an antenna extending therefrom, said connector arm including an antenna connector circuit including a sense pin;

a connector assembly coupled to said connector arm and configured to removably attach said connector arm to said communication device such that, when said connector arm is attached to said device, said antenna may be manually rotated within a permissible rotation range;

a board track affixed to said communication device and having a sense track configured for electrical communication with said sense pin;

a coupling circuit including a coaxial conductor, a switch, and a comparator circuit configured for electrical communication with said transceiver circuit, said coaxial conductor having a first end in electrical communication with said transceiver circuit and a second end in electrical communication with said antenna;

wherein said sense pin electrically engages said sense track to close said switch when said antenna is within said permissible rotation range, and wherein said comparator circuit is configured to enable transmission by said transceiver circuit when said switch is closed;

and further wherein said sense pin electrically disengages said sense track to open said switch when said antenna is outside said permissible rotation range, and wherein said comparator circuit is configured to disable transmission by said transceiver when said switch is open.

19. The communication device of claim 18, wherein a current path is established between said comparator circuit and said switch when said switch is closed, said current path including at least a portion of said coaxial conductor.

* * * * *